United States Patent
Hofer

(10) Patent No.: US 10,760,221 B2
(45) Date of Patent: Sep. 1, 2020

(54) ROAD RAIL STONEBLOWER

(71) Applicant: HARSCO TECHNOLOGIES LLC, Fairmont, MN (US)

(72) Inventor: Brett Hofer, Fairmont, MN (US)

(73) Assignee: HARSCO TECHNOLOGIES LLC, Fairmont, MN (US)

( * ) Notice: Subject to any disclaimer, the term of this patent is extended or adjusted under 35 U.S.C. 154(b) by 251 days.

(21) Appl. No.: 16/014,474

(22) Filed: Jun. 21, 2018

(65) Prior Publication Data
US 2018/0371698 A1 Dec. 27, 2018

Related U.S. Application Data

(60) Provisional application No. 62/523,381, filed on Jun. 22, 2017.

(51) Int. Cl.
*E01B 27/02* (2006.01)
*E01B 27/18* (2006.01)
(Continued)

(52) U.S. Cl.
CPC ............ *E01B 27/022* (2013.01); *E01B 27/18* (2013.01); *E01B 29/04* (2013.01); *E01B 35/00* (2013.01);
(Continued)

(58) Field of Classification Search
CPC .......... E01B 27/02; E01B 27/12; E01B 27/18; E01B 2029/04; E01B 35/00
See application file for complete search history.

(56) References Cited

U.S. PATENT DOCUMENTS 5,577,446 A * 11/1996 Perry ..................... E01B 27/18
                                                              104/11
5,584,641 A * 12/1996 Hansen ................. B65G 33/24
                                                              104/2
(Continued)

FOREIGN PATENT DOCUMENTS

| EP | 0727524 A2 | 8/1996 |
|----|-----------|--------|
| KR | 10-2014-0065774 A | 5/2014 |
| WO | 92/08011 A1 | 5/1992 |

OTHER PUBLICATIONS

International Search Report and Written Opinion of the International Searching Authority dated Oct. 26, 2018 in connection with PCT/US2018/038749.

*Primary Examiner* — Jason C Smith
(74) *Attorney, Agent, or Firm* — Norton Rose Fulbright US LLP

(57) ABSTRACT

The present disclosure generally relates to a road rail stoneblower vehicle for carrying out rail maintenance operations near fixed structures such as bridges and overpasses. The road rail stoneblower includes a hi-rail chassis having a first set of wheels configured to engage a road surface and a second set of wheels configured to engage surfaces of substantially parallel rails of a railroad track. The road rail stoneblower further includes a plurality of workheads that are capable of dispensing ballast stones into a bed of ballast underlying the railroad track to adjust the height of the rails. The road rail stoneblower further includes a leveling system detachedly coupled to the hi-rail chassis that is configured to transmit a detectable signal that defines a reference plane with which the rails are to be aligned. Related methods of operation of the road rail stoneblower vehicle and associated maintenance of ballast beds underlying railroad tracks are also described.

17 Claims, 12 Drawing Sheets

(51) Int. Cl.
*E01B 29/04* (2006.01)
*E01B 35/00* (2006.01)

(52) U.S. Cl.
CPC ..... *E01B 2203/062* (2013.01); *E01B 2203/08* (2013.01); *E01B 2203/10* (2013.01); *E01B 2203/141* (2013.01); *E01B 2203/16* (2013.01)

(56) References Cited

U.S. PATENT DOCUMENTS

| | | | | |
|---|---|---|---|---|
| 5,605,099 | A * | 2/1997 | Sroka | E01B 35/08 104/2 |
| 9,956,974 | B2 * | 5/2018 | Cooper | B61L 15/0081 |
| 10,308,265 | B2 * | 6/2019 | Fahmy | B61L 15/0081 |
| 2001/0042487 | A1 * | 11/2001 | Perry | E01B 27/18 104/2 |
| 2016/0273170 | A1 * | 9/2016 | Hofer | E01B 29/00 |
| 2017/0096779 | A1 * | 4/2017 | Vargas | E01B 29/04 |
| 2018/0371698 | A1 * | 12/2018 | Hofer | E01B 27/18 |

* cited by examiner

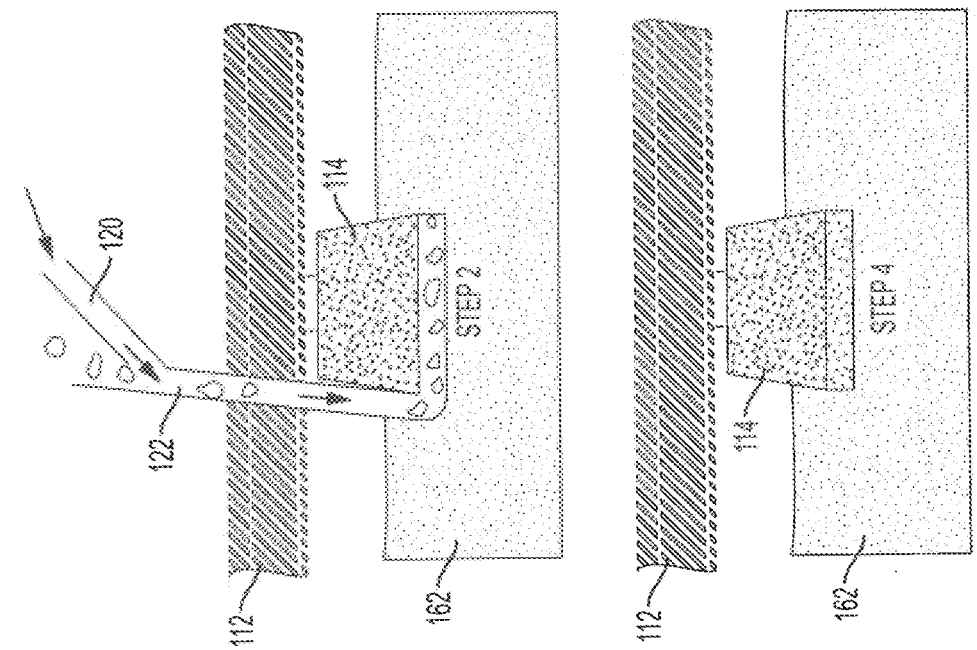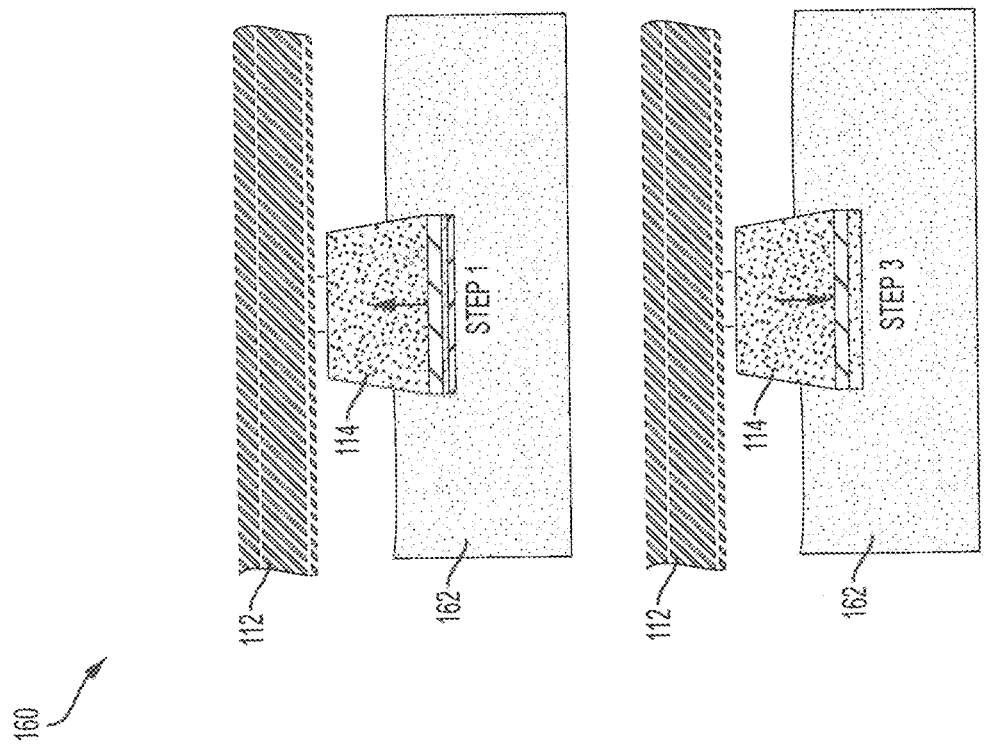
FIG. 10

ROAD RAIL STONEBLOWER

CROSS-REFERENCE TO RELATED APPLICATIONS

This application claims priority to U.S. Provisional App. Ser. No. 62/523,381 filed on Jun. 22, 2017, which is hereby incorporated by reference in its entirety.

BACKGROUND

Railroads are typically constructed to include a pair of elongated, substantially parallel rails, which are coupled to a plurality of laterally extending rail ties. The rail ties are disposed on a ballast bed of hard particulate material such as gravel and are used to support the rails. Over time, normal wear and tear on the railroad may cause the rails to deviate from a desired profile based on movement of the underlying ballast, and as such voids or gaps under the rail ties may appear.

The traditional method of fixing voids that appeared under rail ties was very labor and time intensive, as it required measurement of the voids under each individual rail tie, manually lifting the rail ties, and then spreading a pre-measured quantity of ballast under the rail ties to raise the rails. In the 1970s, British Rail developed a mechanization of the traditional method by modifying a tamper and installing a system for distributing ballast under the rail tie with blasts of compressed air, creating the first stoneblower.

Modern stoneblowers are typically wheeled cars that comprise a track lifting device, a supply of crushed ballast rock, a source of compressed air, and a number of workheads. Each workhead carries a pair of blowing tubes. In operation, the track lifting device raises the track rails and the underlying rail ties to which the rails are secured. The workhead forces the blowing tubes into the ballast adjacent the raised rail ties with each pair of blowing tubes straddling a track rail. Stone is then blown through the blowing tubes into the voids beneath the raised rail ties. The workhead withdraws the blowing tubes and the track rail and rail ties are lowered. The stoneblower then advances to the next set of rail ties and repeats this procedure.

Modern stoneblowers are designed to restore a track's vertical and lateral alignment to an accuracy of 1.0 mm without disturbing the pre-existing compacted ballast layer. Vehicle bogies allow stoneblowers to measure a loaded track profile, and therefore measure the voids in the ballast under each rail tie. Computers then calculate the quantity of ballast to be "blown" under each rail tie to properly align the rail.

Compared with tamping, stoneblowers advantageously can be used on high speed track lines, treat only the areas of the track that need treatment, and reduce ballast damage. Further, after stoneblowing, the track does not become more rigid because the stoneblower only treats areas that need treatment, while the majority of the rail ties are supported on the original ballast and railroad bed. In addition, a new rock supplier is not needed to use a stoneblower for track maintenance. The injected ballast often comes from the same quarries and has the same attrition values as normal ballast. Additionally, using small, crushed stones as ballast causes less damage to the underside of the rail ties because the small stone is less likely to fail under heavy axle load based on increased surface area.

Stoneblowers have some drawbacks, however, based on the current rail-bound design. For example, modern stoneblowers struggle to blow ballast under sections of rails near various fixed structures such as bridges and overpasses. That is, conventional stoneblowers are arranged with the jacking mechanism positioned forward of the blowing tubes. When conventional stoneblowers approach a fixed structure, such as a bridge, such machines are capable of adequately blowing ballast adjacent to the fixed structure in a first direction, but cannot adequately blow ballast adjacent to the fixed structure at the opposite side of the fixed structure due to the positioning of the blowing tubes and jacking mechanism. This is because the jacking mechanism is unable to lift the fixed structure in order to blow ballast underneath a tie located adjacent to the fixed structure.

In the continually changing world of track maintenance, it is essential that rail companies be able to provide quality track maintenance and alignment equipment that can service all sections of rail, including sections of rail adjacent to fixed structures. Further, what is needed is a stoneblower that is agile and more efficient than standard rail-bound stoneblowers. Therefore, an improved stoneblower is desired.

BRIEF SUMMARY

The present disclosure generally relates to an improved stoneblower system comprising a road rail chassis for performing ballast maintenance on sections of railroad track near fixed structures such as bridges and overpasses. The road rail chassis is configured to operate on both road surfaces and railroad tracks. The road rail chassis includes a plurality of workheads that include one or more blowing tubes for dispensing ballast stones into a bed of ballast stones underlying rail ties of a railroad track. The one or more blowing tubes may be lowered into the bed of ballast stone so that new ballast stone may be dispensed into cavities in the bed of ballast stone below the rail ties. Dispensing new ballast stone into the bed of ballast stone raises the height of the bed of ballast stone, thereby raising the height of the overlying rail ties and rails of the railroad tracks. In this manner, alignment of the railroad tracks may be improved and/or maintained.

The road rail chassis also includes a leveling system, such as a laser cart, that is utilized to collect track alignment measurements associated with the railroad track. An onboard or remote computing system is used to calculate appropriate amounts of ballast stone that are to be dispensed into the underlying ballast at particular rail tie locations. Related methods for operating the road rail chassis are also described.

BRIEF DESCRIPTION OF THE DRAWINGS

Reference is now made to the following descriptions taken in conjunction with the accompanying drawings.

FIG. 10 illustrates an exemplary stoneblowing process according to the present disclosure.

DETAILED DESCRIPTION

Various embodiments of a road rail stoneblower are described according to the present disclosure. It is to be understood, however, that the following explanation is merely exemplary in describing the devices and methods of the present disclosure. Accordingly, several modifications, changes, and substitutions are contemplated.

Figure 1:
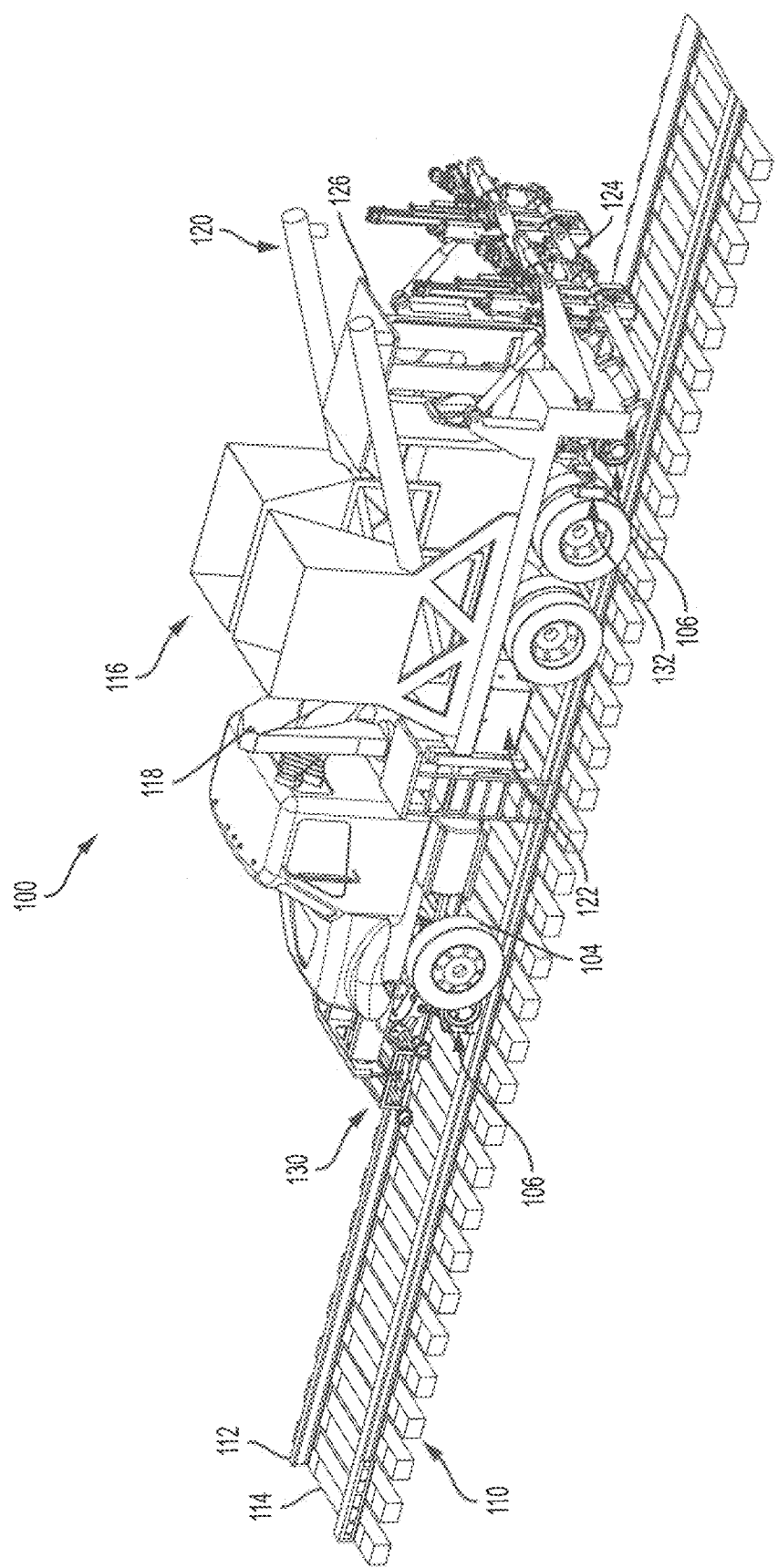
FIG. 1 illustrates a perspective view of an exemplary road rail stoneblower according to the present disclosure.
Figure 2:
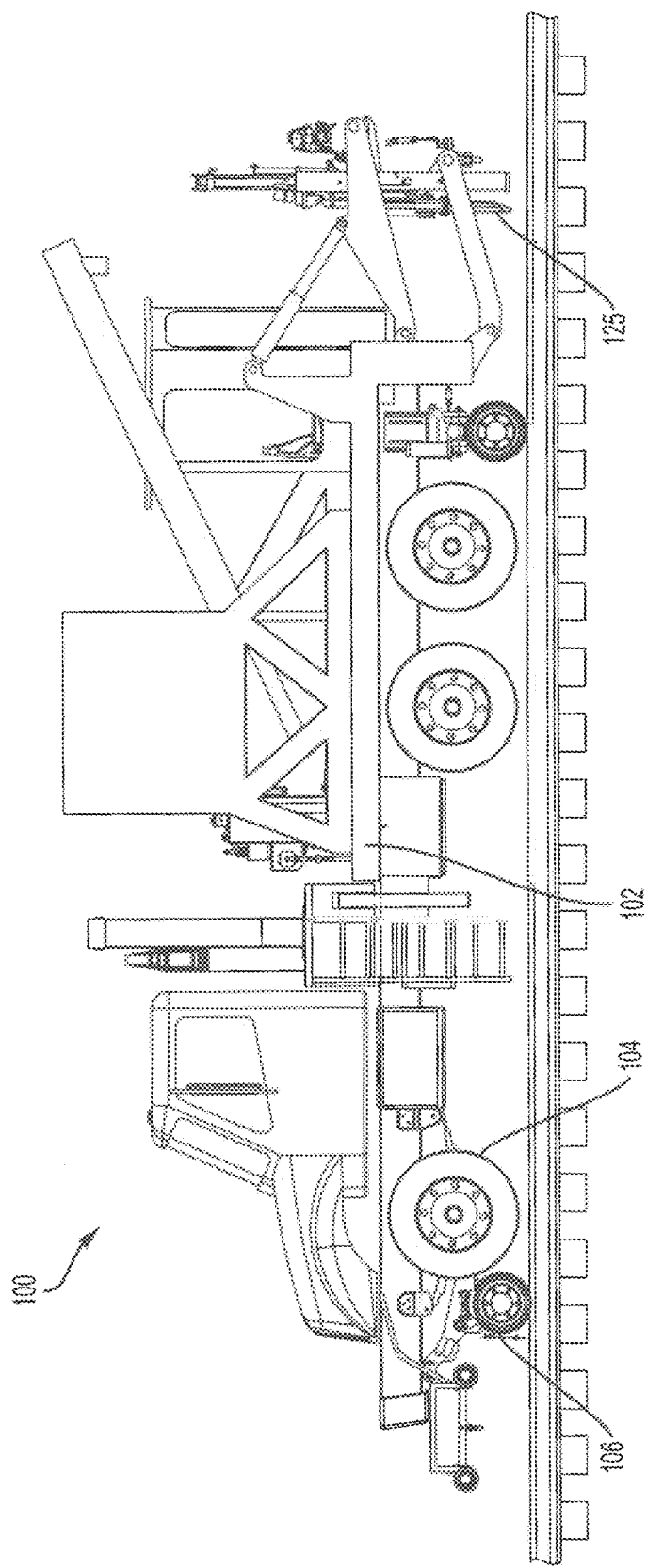
FIG. 2 illustrates a side view of the exemplary road rail stoneblower of FIG. 1.

In an embodiment, and as shown in FIG. 1 and FIG. 2, a road rail stoneblower is depicted having reference numeral 100. The road rail stoneblower 100 may include a chassis 102 configured for operating on both paved or unpaved road surfaces and railroad tracks. For example, the road rail stoneblower 100 may include a first set of wheels 104 configured for traveling on road surfaces as well as a second set of wheels 106 configured for traveling on top of railroad tracks. In this manner, the road rail stoneblower 100 may embody a highway-rail or "hi-rail" vehicle.

As described throughout, an underlying railroad track 110 may include a pair of elongated, substantially parallel rails 112, which may be coupled to a plurality of laterally extending rail ties 114. In some embodiments, a top surface of each rail tie may be coupled to a bottom surface of the rails. The rail ties 114 may be disposed on a ballast bed of hard particulate material such as gravel (e.g., ballast, rocks, and/or the like) and may be used to support the rails.

The road rail stoneblower 100 may propel itself along road surfaces and/or rails of a railroad track using an engine (e.g., a propulsion system and/or operating system for providing propulsion, hydraulic, and/or pneumatic power). The road rail stoneblower 100 may be configured for a certain number of passengers, such as up to four passengers and/or operators, to be on board. In some embodiments, the road rail stoneblower 100 may be operated as a drone vehicle with no on-board personnel.

The road rail stoneblower 100 may include stone hoppers 116 and/or a ballast supply, a loading crane 118, stone augers 120, a track lifting device such as a jack disposed within a manual jack storage 122, and/or a plurality of workheads 124. Each workhead 124 may include a plurality of nozzles for dispensing ballast. The workheads 124 may be operatively coupled to a rear and/or a bed surface of the road rail stoneblower 100. The road rail stoneblower 100 also may include various framing elements for coupling with elements described herein, as well as an operator cab 126.

In some embodiments, ballast stones may include crushed rock, gravel, and/or other small, hard particulate material. Ballast stones may be held in the ballast supply (e.g., a containing device, a hopper, a bin, and/or the like, such as stone hopper 116) of the road rail stoneblower 100. In some embodiments, the ballast supply may include a dispenser and/or conveyor belt for transporting and/or distributing ballast stones to various workheads of the road rail stoneblower 100. In some embodiments, this dispenser and/or conveyor belt may be mechanized and/or controlled by a computing system. Additionally, the ballast supply may include one or more sensors for determining an amount (e.g., a volume, a weight, and/or the like) of ballast stones remaining in the ballast supply and/or an amount of ballast stones to be dispensed to (and/or dispensed by) one or more workheads 124. In some embodiments, determining an amount of ballast stones remaining in the ballast supply may initiate, by the computing system, generation of an automated request for refilling the ballast supply with a predetermined amount of ballast stones. In other embodiments, determining an amount of ballast stones to be dispensed to one or more workheads 124 may be performed by the computing system and/or may occur in response to a measurement associated with the ballast bed as described in more detail below.

Each workhead may be configured to disperse and/or distribute ballast stones through blowing tubes (e.g., nozzles). A lower end of each workhead 124 may comprise one or more nozzles 125. The nozzles 125 may be arranged on a workhead 124 as a single nozzle, a pair of nozzles, and/or any other arrangement of nozzles.

Each nozzle 125 may comprise a vertically elongated opening through which ballast stone is distributed. For example, during operation, a nozzle 125 may be lowered into the ballast bed so that ballast stones may be blown (e.g., inserted and/or injected) into gaps (e.g., voids, cavities, and/or the like) in the ballast bed beneath rail ties 114. This insertion of ballast stones into the ballast bed may raise the rail ties 114 to a desired height so as to stabilize the rail ties and increase alignment of the rails.

In order to assist with ensuring that the rails 112 are aligned and/or leveled to a desired height, the road rail stoneblower 100 may also include a laser cart 130. The laser cart 130 may be stored on a front end of the road rail stoneblower 100. The laser cart 130 may be used as described herein to set a reference plane to which the rails 112 may be adjusted. Although a laser leveling system is described herein as one embodiment, it is to be appreciated that various leveling technology may be used according to the present disclosure. For example, a level and lining system utilizing a projector may be used. Also, wire liners may be used for leveling purposes. Accordingly, various leveling systems are contemplated.

The laser cart 130 may communicate with one or more laser receivers 132 included on the road rail stoneblower 100. These receivers 132 may be positioned at the rear of the road rail stoneblower 100. The receivers 132 may determine height differences along the railroad track 110 in efforts to help identify locations at which ballast is to be inserted into the underlying ballast bed as well as how much ballast is to be inserted at these locations. The laser cart 130 is particularly useful in maintaining railroad track heights at and/or near fixed structures such as bridges and/or overpasses, as often times rail maintenance vehicles such as the road rail stoneblower 100 are too large to work near these fixed structures.

Figure 3:
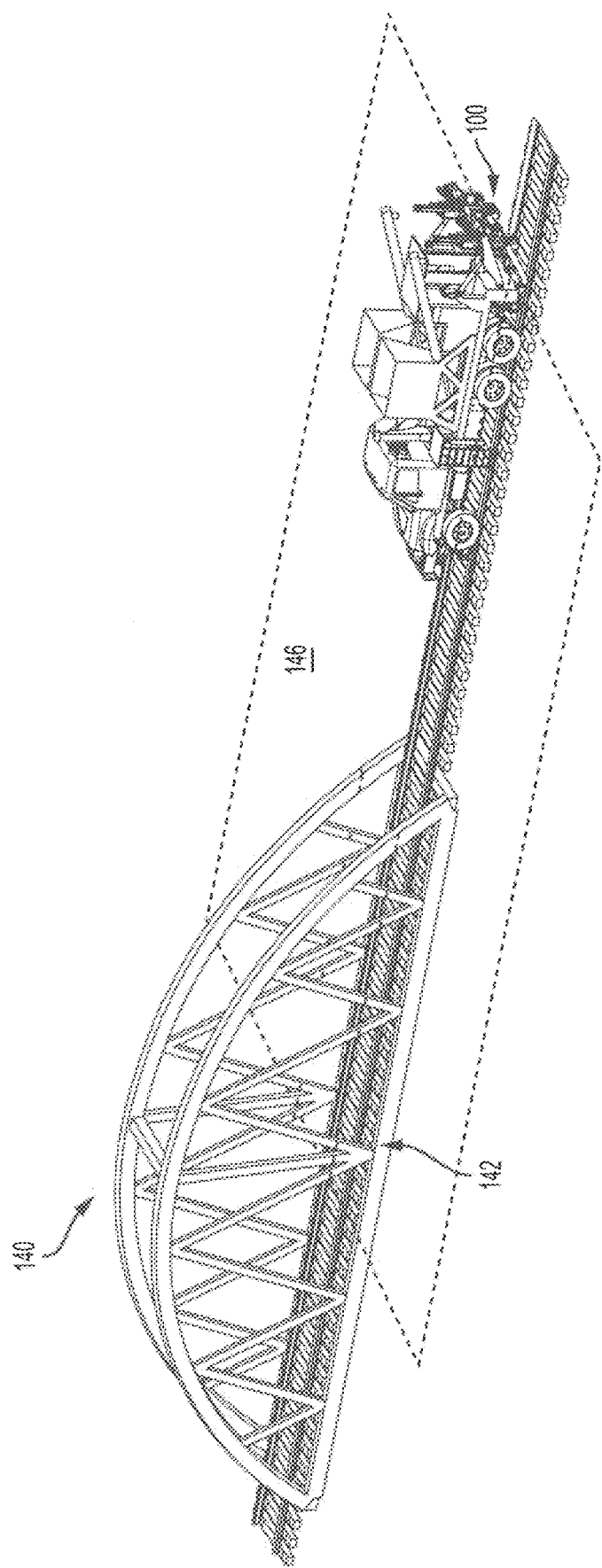
FIG. 3 illustrates a perspective view of the road rail stoneblower of FIG. 1 recording a work area near an exemplary bridge.

An exemplary rail maintenance and accompanying stoneblowing operation is discussed herein. As seen in FIG. 3, the road rail stoneblower 100 may be used at or near fixed structures such as a bridge 140.

Figure 4:
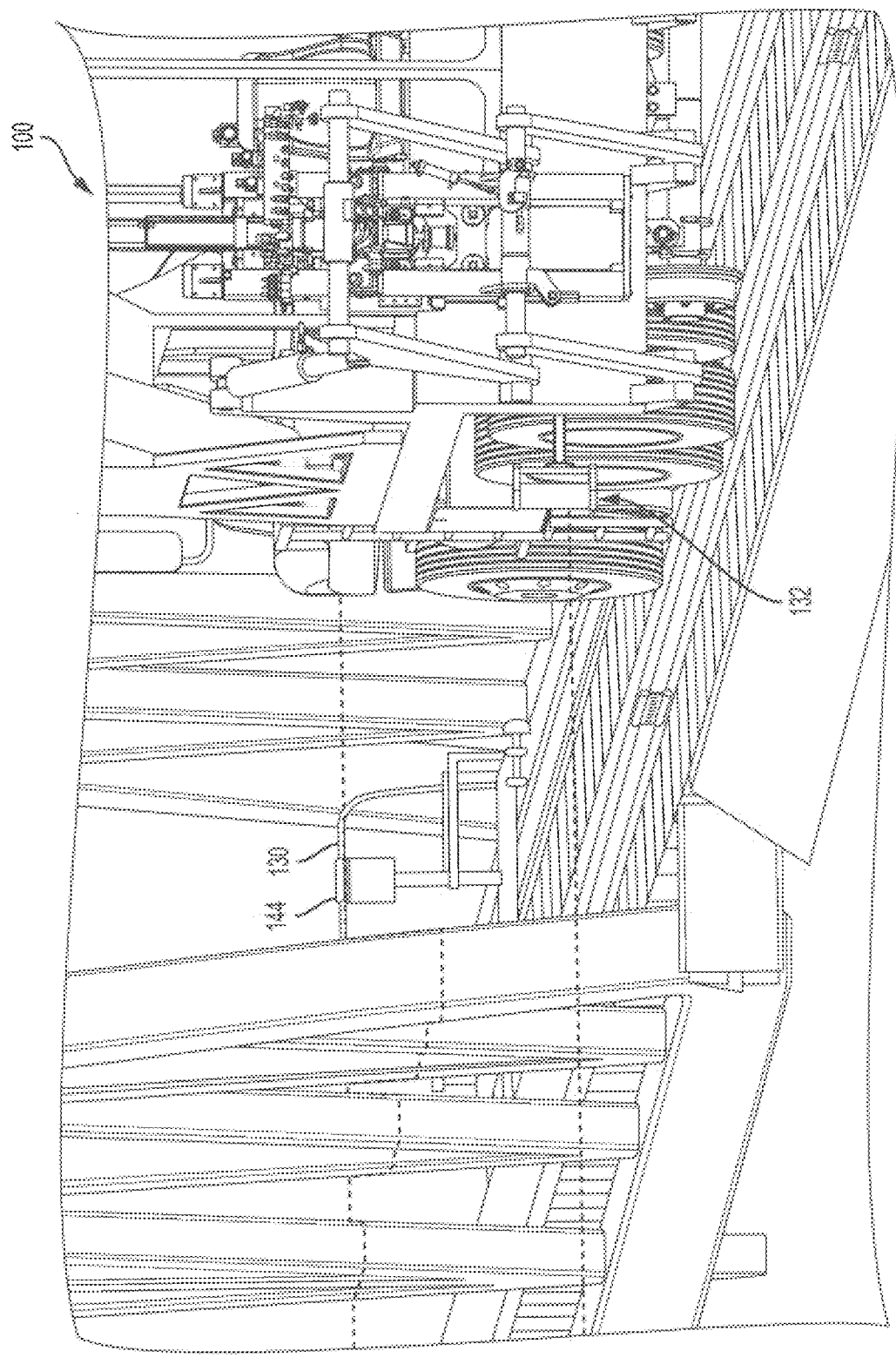
FIG. 4 illustrates a perspective view of the road rail stoneblower of FIG. 1 and an accompanying laser cart operating on an exemplary bridge.
Figure 5:
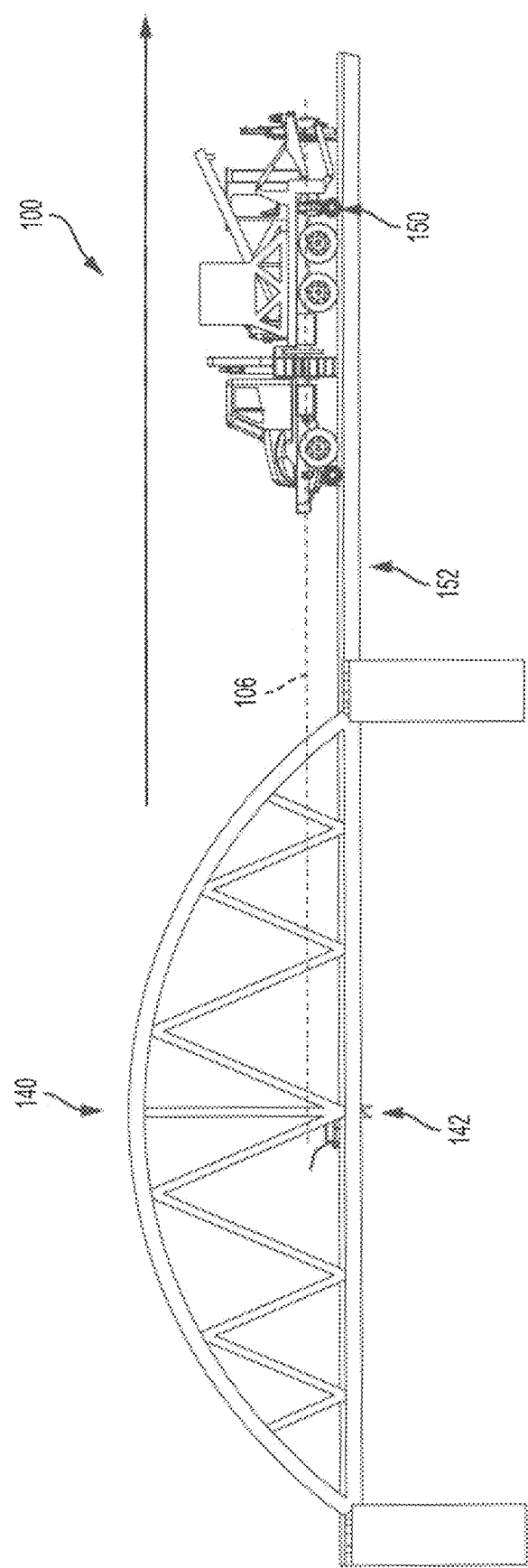
FIG. 5 illustrates a side view of a directional operation of the road rail stoneblower of FIG. 1 during work area recording operations.

As shown in FIG. 4 and FIG. 5, the road rail stoneblower 100 may deploy the laser cart 130 at location 142 on the bridge 140. In some embodiments, the location 142 may be associated with a high point of the bridge 140. The laser cart 130 may include a sending unit 144 configured to establish a desired height associated with the railroad tracks. The sending unit 144 may be enabled to telescopically extend and/or retract in the vertical direction so as to set the sending unit to a desired height. The sending unit 144 of the laser cart 130 may transmit a signal on a substantially flat plane 146 (e.g., a plane parallel to the ground and/or the rails) so as to define a working area along the rails. This plane 146 may serve as a reference plane for maintaining rail heights of the railroad tracks.

Once the laser cart 130 is deployed and in a desired position, the road rail stoneblower 100 may work backwards from a location near the bridge 140 (and thus the location 142) to a location further away from the bridge 140. As the road rail stoneblower 100 reverses along the railroad tracks, the receivers 132 included at the rear of the road rail stoneblower 100 may detect the signal produced by the sending unit 144 of the laser cart 132. The receivers 132 record data from the reference plane with great precision to track the height of the rails at the location of the receivers.

The receivers 132 may detect the laser signal associated with the reference plane produced by the sending unit 144 of the laser cart 130 with less than approximately one millimeter center resolution. In some embodiments, the receivers 132 may be positioned and/or mounted approximately 9.84 inches above the rails underlying the road rail stoneblower 100. The road rail stoneblower 100 may be loaded with stones to simulate the weight of a train and/or other load for maximum accuracy.

By continuously recording the height of the reference plane with respect to a fixed height of the receivers 132 on the road rail stoneblower 100, the receivers may determine height differences of the rails 112 at the location 142 and the location of the receivers on the road rail stoneblower 100 (e.g., location 150). Encoders on Hi-Rail (e.g., rail) wheels 106 may track the distance traveled along the rails from a particular reference location 152 (e.g., a location from which the road rail stoneblower 100 began reversing after the laser cart was deployed). In this manner, it may be determined at which precise locations, such as at particular rail ties, ballast is to be added. It may also be determined at which precise locations, such as at particular rail ties, rail ties are to be raised and/or jacked.

Based on the determined difference in rail height between the two locations 142, 150, an amount of ballast to be added to the ballast bed at the location 150 may be calculated. By adding the determined amount of ballast at the location 150, the tracks may be substantially aligned with the laser plane so that the height of the rails at location 150 is substantially equal to the height of the rails at location 142. Additionally, a height to which the underlying rails and/or rail ties need to be jacked and/or raised in order for the determined amount of ballast to be added may be calculated based on the determined difference in rail height between the two locations 142, 150.

In some embodiments, the determined difference in rail height between the two locations 142, 150 may be compared to a threshold value to determine whether ballast needs to be added at location 150. If the determined difference in rail height between the two locations 142, 150 exceeds a threshold value, it may be determined that ballast indeed needs to be added at location 150. Calculations of an amount of ballast and a height to which particular sections of rails are to be raised to perform stoneblowing operations may be performed in response to determining that the determined difference in rail height between the locations 142, 150 exceeds the threshold value. Alternatively, if the determined difference in rail height between the two locations 142, 150 does not exceed a threshold value, it may be determined that no ballast is to be added at location 150. Thus, the road rail stoneblower 100 may continue to a next location (e.g., an adjacent rail tie, and/or the like).

Identifiers associated with each of the locations 142, 150, 152, as well as rail height readings collected by the receivers 132 at each location 142, 150, 152 may be stored for later recall and/or processing. Additionally, translational readings captured by encoders of the rail wheels may also be stored for later recall and/or processing.

Figure 6:
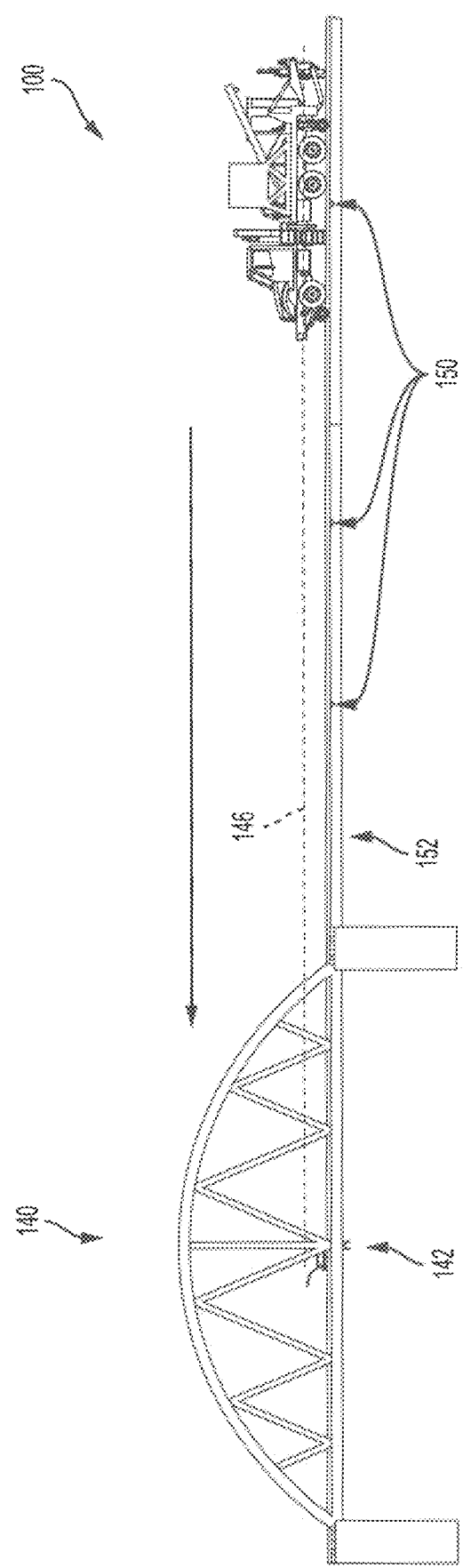
FIG. 6 illustrates a side view of a directional operation of the road rail stoneblower of FIG. 1 during track jacking operations.
Figure 7:
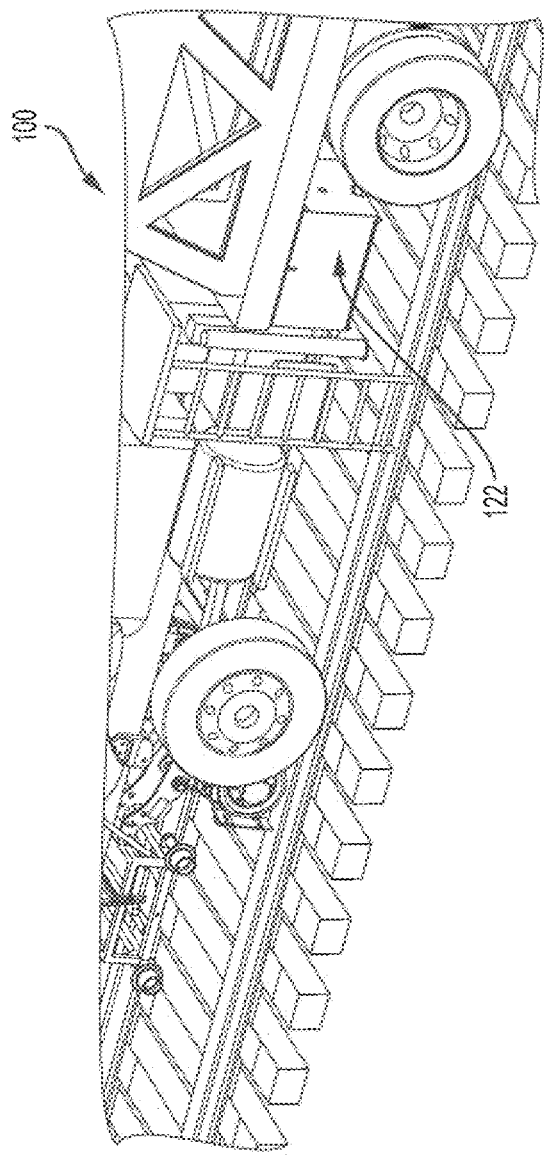
FIG. 7 illustrates a perspective view of jack storage of the road rail stoneblower of FIG. 1.

As shown in FIG. 6, once the amount of stone to be inserted into the ballast and the jacking heights have been calculated for desired locations 150, the road rail stoneblower 100 may proceed to move to a first location 150 in a forward direction toward the laser cart location 142. The road rail stoneblower 100 may then be utilized to jack the rails 112 up to a desired height based on the calculations. For example, the road rail stoneblower 100 may be utilized to lift a portion of the rails 112 and/or rail ties 114 so that ballast stones may be blown into the ballast bed underlying the rail ties. The road rail stoneblower 100 may lift the rail 112 and/or underlying rail ties 114 to a predetermined distance above of the ballast bed so that a desired (e.g., the calculated) amount of ballast stones may be inserted underneath the lifted rail ties at locations 150. In some embodiments, the movements of the road rail stoneblower 100 may be controlled by the computing system as described herein. Various jacks such as pancake jacks may also be deployed at locations 108 and/or at various set intervals along the rails. Further, in addition to manual jacks, automatic jacks that are based off the frame of the vehicle may be used. In the case of manual jacks, as shown in FIG. 7, the jacks may be stored in road rail stoneblower 100 at storage 122.

Figure 8:
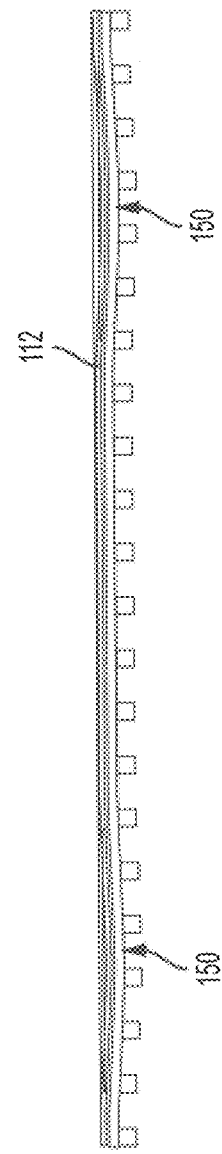
FIG. 8 illustrates a side view of an exemplary railroad track profile according to the present disclosure.

FIG. 8 illustrates an exemplary side profile of rails 112 at locations 150 where the rails may be not level with the reference plane, and thus may be jacked up to a predetermined height so that ballast may be inserted into the underlying ballast bed. FIG. 8 also illustrates how stoneblowing is advantageous compared to tamping.

Figure 9:
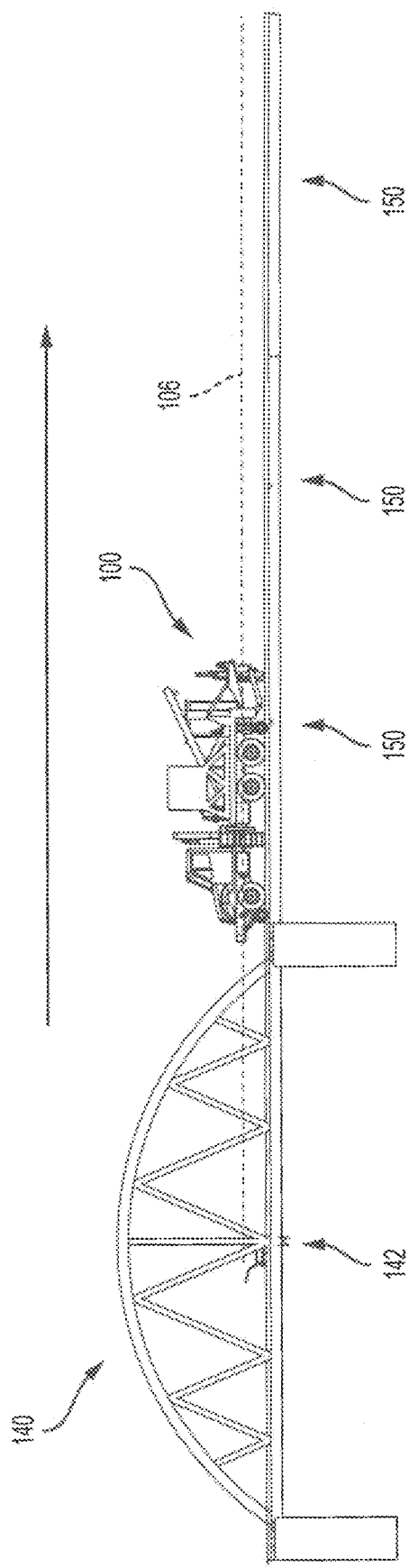
FIG. 9 illustrates a side view of a directional operation of the road rail stoneblower of FIG. 1 during stoneblowing operations.

Referring to FIG. 9, once the track 110 has been jacked, the road rail stoneblower 100 then proceeds backward again in a direction away from the laser cart to locations 150. At each location 150, the road rail stoneblower 100 blows the predetermined amount of ballast into the underlying ballast bed. By inserting ballast into the underlying ballast bed at locations 150, the rails may be substantially aligned with the reference plane.

FIG. 10 illustrates an exemplary stoneblowing operation 160. In a first step, the road rail stoneblower 100 may move along rails 112 to a desired position (e.g., location 150) on a particular section of railroad track. A track design computer (e.g., a computing system as described herein) associated with the road rail stoneblower 100 and in communication with the one or more receivers 132, the laser cart 130, and/or the encoders of the rail wheels 106 may instruct the road rail stoneblower 100 to lift the rail(s) 112 to at least the predetermined height so that adequate space in a ballast bed 162 underlying the rails is present (e.g., see step 1 of FIG. 11).

In step 2 of FIG. 10, the calculated amount of ballast stone may be inserted (e.g., blown) into the ballast bed 162 underneath one or more rail tie(s) 114 to achieve a desired track height at location 150. For example, ballast stones may be blown underneath the rail tie 114 associated with the lifted rail 112, thereby accumulating new ballast stones in the ballast bed 162 under the rail(s) 112 and/or rail tie(s) 114.

Once the determined amount of ballast stones is injected into the ballast bed 162, the road rail stoneblower 100 and/or an operator may lower the rails 112 and/or the rail ties 114 (e.g., see step 3 of FIG. 10) so that the rail ties rest on the ballast bed 162 (e.g., see step 4 of FIG. 10). Because of the ballast stones being injected into the ballast bed 162 to raise the ballast bed, the rail(s) 112 and/or rail tie(s) 114 may similarly be raised, thereby leveling the rails to a desired height and/or alignment (e.g., track profile). The road rail stoneblower 100 may then move along to another section and/or location 150 on the rails and repeat the aforementioned stoneblowing process.

Because the stoneblower according to the present disclosure is a road rail stoneblower, it may easily maneuver between traveling in a first direction to traveling in a second direction. This is particularly advantageous in situations where stoneblowing operations are desired adjacent to a fixed structure, such as a bridge. As discussed above, given the ordering of the stoneblowing tubes and the jacks, once stoneblowing operations have been performed at a first side of a fixed structure, it is necessary to turn the stoneblower around in order to perform stoneblowing operations at a second, opposite side of the fixed structure. With conventional rail-bound stoneblowers (i.e., stoneblowers configured for rail travel only), it is difficult and time-consuming to turn such machines around to perform stoneblowing operations at an opposite side of the fixed structure. In contrast, the road rail stoneblower according to the present disclosure can be easily maneuvered into facing an opposite direction to perform stoneblowing operations at an opposite side of the fixed structure. In addition, it may be desired to only perform spot stoneblowing, or stoneblowing at discrete portions of the track, rather than along a lengthy portion of track. The road rail stoneblower according to the present disclosure, given its smaller size and agile maneuverability, is able to perform such spot stoneblowing at a more efficient pace. The road rail stoneblower according to the present disclosure also reduces track time needed for stoneblowing operations as it can easily maneuver on and off the track, thus allowing for passing of other train traffic with minimal delay.

Figure 11:
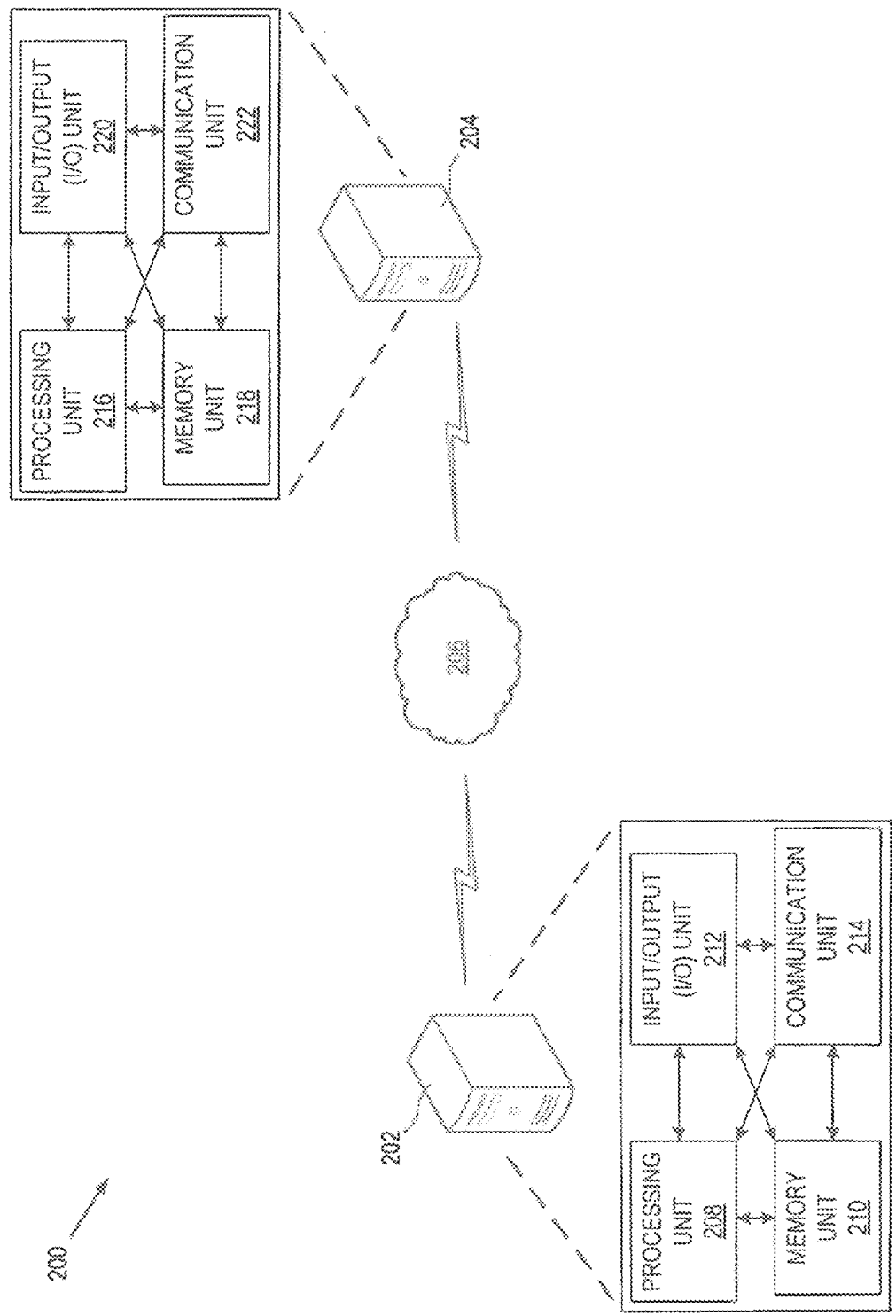
FIG. 11 illustrates an exemplary computing system according to the present disclosure.

FIG. 11 illustrates a computing system 200 for enabling operation of the road rail stoneblower 100 of FIGS. 1-10 and/or any other railroad track feature detection system described herein. In some embodiments, the computing system 200 may include a first server 202 and a second server 204. The first server 202 may be associated with the road rail stoneblower 100 (e.g., an onboard control system), whereas the second server 204 may be associated with an offsite computing system. Alternatively, the first server 202 may be associated with the road rail stoneblower 100, whereas the second server 204 may be associated with the laser cart.

The first server 202 and the second server 204 may be communicatively coupled to one another by a network 206 as described herein. As such, a variety of data may be transmitted between the first server 202 and the second server 204 during surveying and stoneblowing processes described herein. The network 206 may include any wireless and/or wired communications network that facilitates communication between the first server 202 and the second server 204, as well as between any other computing devices (e.g., a user's smartphone, a third party server, and/or the like). For example, the network 206 may include an Ethernet network, a cellular network, a computer network, the Internet, a wireless fidelity (Wi-Fi) network, a light fidelity (Li-Fi) network, a Bluetooth network, a radio frequency identification (RFID) network, a near-field communication (NFC) network, a laser-based network, a controller area network (CAN), and/or the like. In some embodiments, the network 206 may also include a plurality of networks.

The first server 202 may be associated with the road rail stoneblower 100. For example, the first server 202 may include a computer onboard the road rail stoneblower 100 that enables operation of electronics included in the road rail stoneblower 100 and/or the laser cart. In some embodiments, the first server 202 may include a computing device such as a mainframe server, a content server, a communication server, a laptop computer, a desktop computer, a handheld computing device, a smart phone, a smart watch, a wearable device, a touch screen, a biometric device, a video processing device, an audio processing device, a cloud-based computing solution and/or service, and/or the like. The first server 202 may also include multiple servers and/or computing devices configured to communicate with one another and/or implement techniques described herein.

Figure 12:
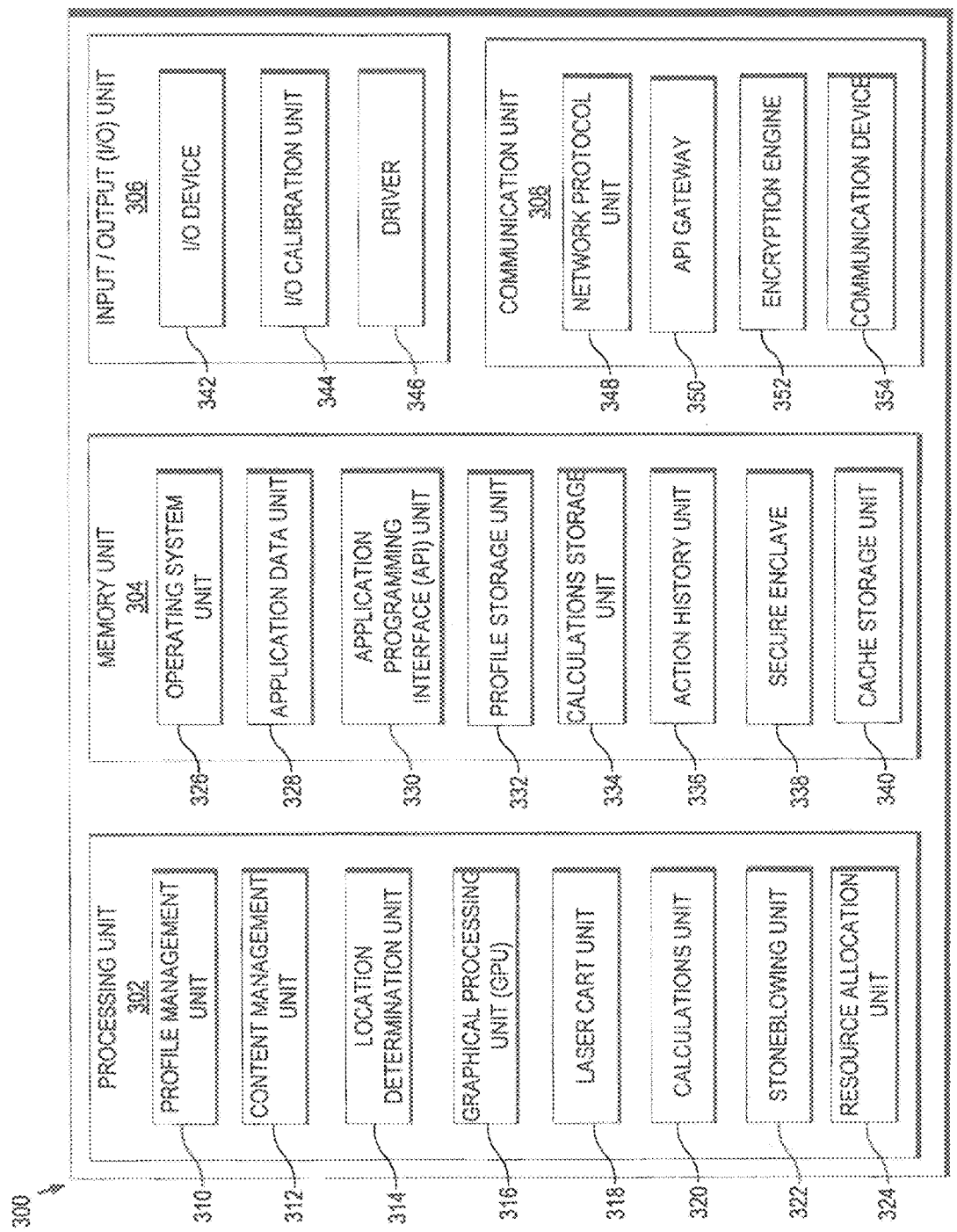
FIG. 12 illustrates an exemplary computing environment according to the present disclosure.
Figure 13:
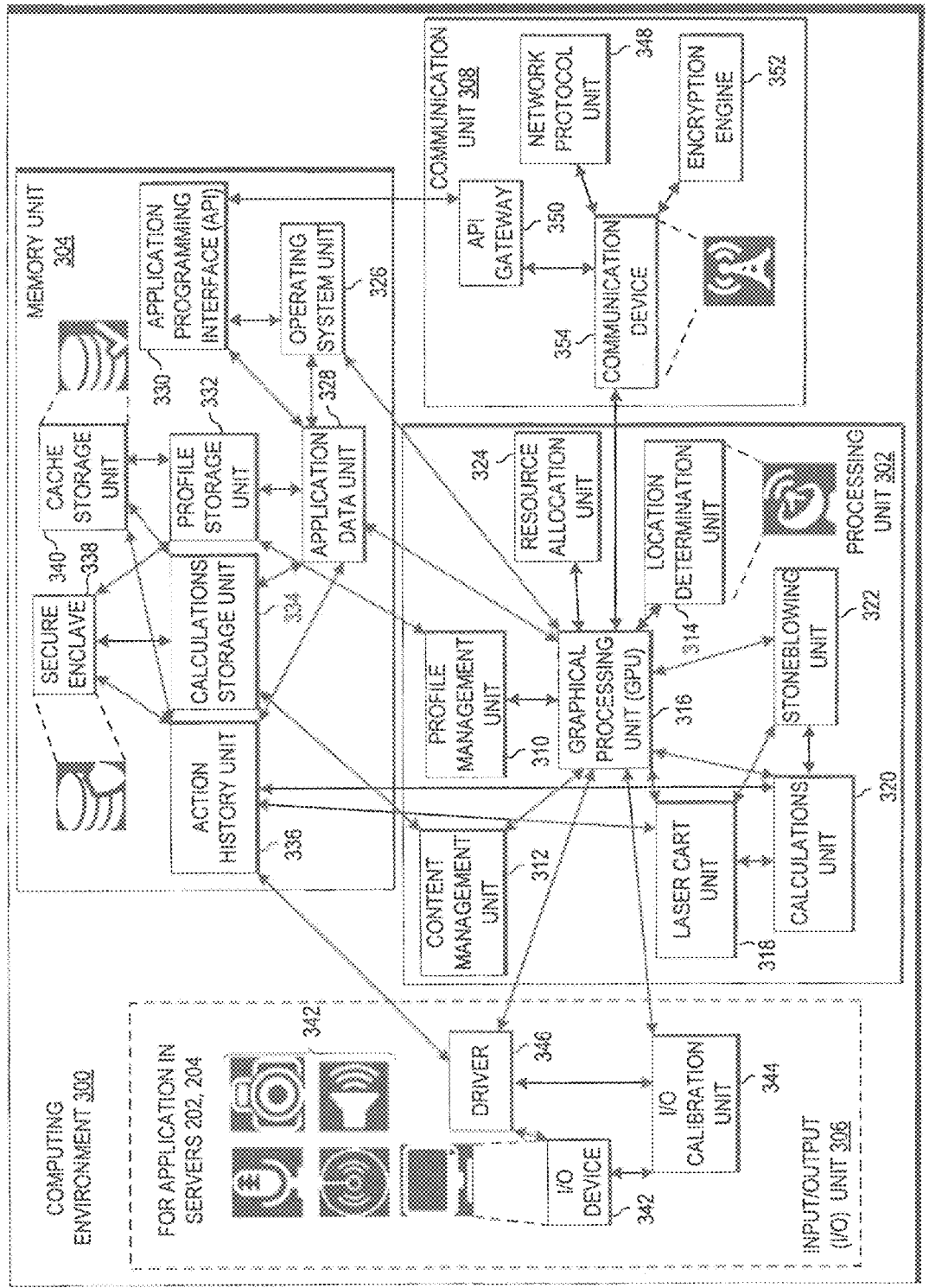
FIG. 13 illustrates an exemplary connectivity diagram of the computing environment of FIG. 12.

The first server 202 may include various elements of a computing environment as described herein (e.g., computing environment 300 of FIGS. 12 and 13). For example, the first server 202 may include a processing unit 208, a memory unit 210, an input/output (I/O) unit 212, and/or a communication unit 214. Each of the processing unit 208, the memory unit 210, the input/output (I/O) unit 212, and/or the communication unit 214 may include one or more subunits and/or other computing instances as described herein for performing operations associated with stoneblowing.

The second server 204 may be associated with an off-site computing device for processing captured data associated with railroad tracks and/or stoneblowing operations. For example, the second server 204 may include a cloud-based server that is not onboard the road rail stoneblower 100. In some embodiments, the second server 204 may include a computing device such as a mainframe server, a content server, a communication server, a laptop computer, a desktop computer, a handheld computing device, a smart phone, a smart watch, a wearable device, a touch screen, a biometric device, a video processing device, an audio processing device, a cloud-based computing solution and/or service, and/or the like. The second server 204 may also include multiple servers and/or computing devices configured to communicate with one another and/or implement techniques described herein.

The second server 204 may include various elements of a computing environment as described herein (e.g., computing environment 300 of FIG. 12 and FIG. 13). For example, the second server 204 may include a processing unit 216, a memory unit 218, an input/output (I/O) unit 220, and/or a communication unit 222. Each of the processing unit 216, the memory unit 218, the input/output (I/O) unit 220, and/or the communication unit 222 may include one or more subunits and/or other computing instances as described herein for performing operations associated with stoneblowing.

FIG. 12 and FIG. 13 illustrate exemplary functional and system diagrams of a computing environment 300 for enabling railroad track feature detection and associated image processing techniques described herein. Specifically, FIG. 12 provides a functional block diagram of the computing environment 300, whereas FIG. 13 provides a detailed system diagram of the computing environment 300 Additionally, any units and/or subunits described herein with reference to the computing environment 300 of FIG. 12 and/or FIG. 13 may be included in one or more elements of FIG. 11, such as the first server 202 and/or the second server 204. The computing environment 300 and/or any of its units and/or subunits described herein may include general hardware, specifically-purposed hardware, and/or software.

The computing environment 300 may include, among other elements, a processing unit 302, a memory unit 304, an input/output (I/O) unit 306, and/or a communication unit 308. As described herein, each of the processing unit 302, the memory unit 304, the I/O unit 306, and/or the communication unit 308 may include and/or refer to a plurality of respective units, subunits, and/or elements. Furthermore, each of the processing unit 302, the memory unit 304, the I/O unit 306, and/or the communication unit 308 may be operatively and/or otherwise communicatively coupled with each other so as to facilitate railroad track feature detection and associated image analysis techniques described herein. Further, the processing unit 302, the memory unit 304, the I/O unit 306, and/or the communication unit 308 may refer to the processing unit 208, the memory unit 210, the I/O unit 212, and/or the communication unit 214 of the first server 202 of FIG. 11. Additionally, the processing unit 302, the memory unit 304, the I/O unit 306, and/or the communication unit 308 may refer to the processing unit 216, the memory unit 218, the I/O unit 220, and/or the communication unit 222 of the second server 202 of FIG. 11.

The processing unit 302 may control any of the one or more units 304, 306, 308, as well as any included subunits, elements, components, devices, and/or functions performed by the units 304, 306, 308 included in the computing environment 300. The described sub-elements of the computing environment 300 may also be included in similar fashion in any of the other units and/or devices included in the system 200 of FIG. 11. Additionally, any actions described herein as being performed by a processor may be taken by the processing unit 302 alone and/or by the processing unit 228 in conjunction with one or more additional processors, units, subunits, elements, components, devices, and/or the like. Additionally, while only one processing unit 302 may be shown in FIG. 12 and/or FIG. 13, multiple processing units may be present and/or otherwise included in the computing environment 300 or elsewhere in the overall system (e.g., elements of road rail stoneblower 100). Thus, while instructions may be described as being executed by the processing unit 302 (and/or various subunits of the processing unit 302), the instructions may be executed simultaneously, serially, and/or otherwise by one or multiple processing units.

In some embodiments, the processing unit 302 may be implemented as one or more computer processing unit (CPU) chips and/or graphical processing unit (GPU) chips and may include a hardware device capable of executing computer instructions. The processing unit 302 may execute instructions, codes, computer programs, and/or scripts. The instructions, codes, computer programs, and/or scripts may be received from and/or stored in the memory unit 304, the I/O unit 306, the communication unit 308, subunits and/or elements of the aforementioned units, other devices and/or computing environments, and/or the like.

In some embodiments, the processing unit 302 may include, among other elements, subunits such as a profile management unit 310, a content management unit 312, a location determination unit 314, a graphical processing unit (GPU) 316, a laser cart unit 318, a calculations unit 320, a stoneblowing unit 322, and/or a resource allocation unit 324. Each of the aforementioned subunits of the processing unit 302 may be communicatively and/or otherwise operably coupled with each other.

The profile management unit 310 may facilitate generation, modification, analysis, transmission, and/or presentation of a profile associated with a railroad track. For example, the profile management unit 310 may operate a database associated with a railroad track and may manage information associated with the railroad track and/or the road rail stoneblower 100 as described herein. The profile management unit 310 may receive, process, analyze, organize, and/or otherwise transform any data received from the user and/or another computing element so as to generate a profile of a railroad track that includes route information, status information, track feature information, maintenance information, marker information, and/or location information of various rail elements.

The content management unit 312 may facilitate generation, modification, analysis, transmission, and/or presentation of user interfaces for controlling the road rail stoneblower 100 described herein. For example, the content management unit 312 may control the audio-visual environment and/or appearance of application data during execution of various processes. Media content for which the content management unit 312 may be responsible may include advertisements, images, text, themes, audio files, video files, documents, and/or the like. In some embodiments, the content management unit 312 may also interface with a third-party content server and/or memory location.

The location determination unit 314 may facilitate detection, generation, modification, analysis, transmission, and/or presentation of location information. Location information may include global positioning system (GPS) coordinates, a mile marker, an Internet protocol (IP) address, a media access control (MAC) address, geolocation information, an address, a port number, a zip code, a server number, a proxy name and/or number, device information (e.g., a serial number), and/or the like. In some embodiments, the location determination unit 314 may include various sensors, a radar, and/or other specifically-purposed hardware elements for enabling the location determination unit 314 to acquire, measure, and/or otherwise transform location information. In some embodiments, location-acquiring hardware may be utilized by the location determination unit 314 for determining locations of the road rail stoneblower 100, the laser cart, and/or reference locations during operation.

The GPU unit 316 may facilitate generation, modification, analysis, processing, transmission, and/or presentation of data captured by the road rail stoneblower 100. In some embodiments, the GPU unit 316 may be utilized to render visual content for presentation on a user device, analyze laser data (e.g., sensor readings, and/or the like), and/or the like. The GPU unit 316 may also include multiple GPUs and therefore may be configured to perform and/or execute multiple processes in parallel.

The laser cart unit 318 may facilitate operation of the laser cart. The laser cart unit 318 may control operation of the sending unit, the location of the laser cart, and/or the like. The laser cart unit 328 may further facilitate the collection of data, the calibration of the sending unit, the communication of signals and/or data between the laser cart and other elements of the road rail stoneblower 100, and/or the like. The laser cart unit 328 may also facilitate operation of the receivers on the road rail stoneblower 100.

The calculations unit 320 may facilitate the computation of various pieces of information during operation of the road rail stoneblower 100. For example, the calculations unit 320 may enable determination of an amount of ballast to be injected into a ballast bed at a location, a height up to which rails and/or rail ties need to be jacked at a particular location, a distance traveled by the road rail stoneblower 100, a distance from a reference location, and/or any other value.

The stoneblowing unit 322 may facilitate the operation of one or more stoneblowing workheads of the road rail stoneblower 100. For example, the stoneblowing unit 322 may control the dispensing of stones into an underlying ballast bed at various locations. The stoneblowing unit 322 may also facilitate operation of one or more couplings and/or hydraulic and/or pneumatic mechanisms associated with road rail stoneblower 100.

The resource allocation unit 324 may facilitate the determination, monitoring, analysis, and/or allocation of computing resources throughout the road rail stoneblower 100 described herein. For example, the road rail stoneblower 100 may facilitate a high volume of (e.g., multiple) processes simultaneously. As such, computing resources of the computing environment 300 (and/or any subunit of the aforementioned units) such as processing power, data storage space, network bandwidth, and/or the like may be in high demand at various times during operation. Accordingly, the resource allocation unit 324 may be configured to manage the allocation of various computing resources as they are required by particular units and/or subunits of the computing environment 300 and/or other computing environments. In some embodiments, the resource allocation unit 324 may include sensors and/or other specially-purposed hardware for monitoring performance of each unit and/or subunit of the computing environment 300, as well as hardware for responding to the computing resource needs of each unit and/or subunit. In some embodiments, the resource allocation unit 324 may utilize computing resources of a second computing environment separate and distinct from the computing environment 300 to facilitate a desired operation.

For example, the resource allocation unit 324 may determine a number of simultaneous communication connections and/or incoming requests for data. The resource allocation unit 324 may then determine that the number of simultaneous communication connections and/or incoming requests for data meets and/or exceeds a predetermined threshold value. Based on this determination, the resource allocation unit 324 may determine an amount of additional computing resources (e.g., processing power, storage space of a particular non-transitory computer-readable memory medium, network bandwidth, and/or the like) required by the processing unit 302, the memory unit 304, the I/O unit 306, the communication unit 308, and/or any subunit of the aforementioned units for enabling safe and efficient operation of the computing environment 300 while supporting the number of simultaneous communication connections and/or incoming requests. The resource allocation unit 324 may then retrieve, transmit, control, allocate, and/or otherwise distribute determined amount(s) of computing resources to each element (e.g., unit and/or subunit) of the computing environment 300 and/or another computing environment.

In some embodiments, factors affecting the allocation of computing resources by the resource allocation unit 324 may include the number of ongoing communication connections and/or other communication channel connections, a number of image analysis and/or reporting processes, a duration of time during which computing resources are required by one or more elements of the computing environment 300, and/or the like. In some embodiments, computing resources may be allocated to and/or distributed amongst a plurality of second computing environments included in the computing environment 300 based on one or more factors mentioned above. In some embodiments, the allocation of computing resources of the resource allocation unit 324 may include the resource allocation unit 324 flipping a switch, adjusting processing power, adjusting memory size, partitioning a memory element, transmitting data, controlling one or more input and/or output devices, modifying various communication protocols, and/or the like. In some embodiments, the resource allocation unit 324 may facilitate utilization of parallel processing techniques such as dedicating a plurality of GPUs included in the processing unit 302 for processing data.

In some embodiments, the memory unit 304 may be utilized for storing, recalling, receiving, transmitting, and/or accessing various files and/or information during operation of the computing environment 300. For example, the memory unit 304 may be utilized for storing collected data, laser readings, distance readings, image frames, video streams, storing, recalling, and/or updating railroad track profile information, marker information, track feature information, and/or the like. The memory unit 304 may include various types of data storage media such as solid state storage media, hard disk storage media, and/or the like. The memory unit 304 may include dedicated hardware elements such as hard drives and/or servers, as well as software elements such as cloud-based storage drives. For example, the memory unit 304 may include various subunits such as an operating system unit 326, an application data unit 328, an application programming interface (API) unit 330, a profile storage unit 332, a calculations storage unit 334, an action history unit 336, a secure enclave 338, and/or a cache storage unit 340.

The memory unit 304 and/or any of its subunits described herein may include random access memory (RAM), read only memory (ROM), and/or various forms of secondary storage. RAM may be used to store volatile data and/or to store instructions that may be executed by the processing unit 302. For example, the data stored may be a command, a current operating state of the computing environment 300, an intended operating state of the computing environment 300, and/or the like. As a further example, data stored in the memory unit 304 may include instructions related to various methods and/or functionalities described herein. ROM may be a non-volatile memory device that may have a smaller memory capacity than the memory capacity of a secondary storage. ROM may be used to store instructions and/or data that may be read during execution of computer instructions. In some embodiments, access to both RAM and ROM may be faster than access to secondary storage. Secondary storage may be comprised of one or more disk drives and/or tape drives and may be used for non-volatile storage of data or as an over-flow data storage device if RAM is not large enough to hold all working data. Secondary storage may be used to store programs that may be loaded into RAM when such programs are selected for execution. In some embodiments, the memory unit 304 may include one or more databases for storing any data described herein. Additionally or alternatively, one or more secondary databases located remotely from the computing environment 300 may be utilized and/or accessed by the memory unit 304.

The operating system unit 326 may facilitate deployment, storage, access, execution, and/or utilization of an operating system utilized by the computing environment 300 and/or any other computing environment described herein. In some embodiments, the operating system may include various hardware and/or software elements that serve as a structural framework for enabling the processing unit 302 to execute various stoneblowing operations described herein. The operating system unit 326 may further store various pieces of information and/or data associated with operation of the operating system and/or the computing environment 300 as a whole, such as a status of computing resources (e.g., processing power, memory availability, resource utilization, and/or the like), runtime information, modules to direct execution of operations described herein, and/or the like.

The application data unit 328 may facilitate deployment, storage, access, execution, and/or utilization of an application utilized by the computing environment 300 and/or any other computing environment described herein (e.g., the first server 202 and/or the second server 204 of FIG. 11). For example, users may be required to download, access, and/or otherwise utilize a software application on a computing device in order for various operations described herein to be performed. As such, the application data unit 328 may store any information and/or data associated with the application. Information included in the application data unit 328 may enable a user and/or computer processor to execute various operations described herein. The application data unit 328 may further store various pieces of information and/or data associated with operation of the application and/or the computing environment 300 as a whole, such as a status of computing resources (e.g., processing power, memory availability, resource utilization, and/or the like), runtime information, modules to direct execution of operations described herein, and/or the like.

The API unit 300 may facilitate deployment, storage, access, execution, and/or utilization of information associated with APIs of the computing environment 300 and/or any other computing environment described herein. For example, the computing environment 300 may include one or more APIs for enabling various devices, applications, and/or computing environments to communicate with each other and/or utilize the same data. Accordingly, the API unit 330 may include API databases containing information that may be accessed and/or utilized by applications and/or operating systems of other devices and/or computing environments. In some embodiments, each API database may be associated with a customized physical circuit included in the memory unit 304 and/or the API unit 330. Additionally, each API database may be public and/or private, and so authentication credentials may be required to access information in an API database.

The profile storage unit 332 may facilitate deployment, storage, access, and/or utilization of information associated with profiles of railroad tracks, track features, reference locations, elements of the road rail stoneblower 100, and/or rail markers. For example, the profile storage unit 332 may store a track profile, identification information, marker information, track feature information, location information, and/or metadata associated with a railroad track and/or a railroad chassis. In some embodiments, the profile storage unit 332 may communicate with the profile management unit 310 to receive and/or transmit information associated with a railroad profile.

The calculations storage unit 334 may facilitate deployment, storage, access, and/or utilization of information calculated by the computing environment 300. For example, calculated values associated with amounts of ballast to be dispensed at a particular location, heights up to which rails are to be raised at a particular location, distances traveled, and/or the like may be stored in the calculations storage unit 334.

The action history unit 336 may facilitate deployment, storage, access, analysis, and/or utilization of information associated with actions taken by the road rail stoneblower 100 during operation. Each movement by each individual element of the road rail stoneblower 100 may be monitored and tracked and stored in the action history unit 336. In this manner, a log of activity of the road rail stoneblower 100 may be saved in the action history unit 336 for later processing.

The secure enclave 338 may facilitate secure storage of data. In some embodiments, the secure enclave 338 may include a partitioned portion of storage media included in the memory unit 304 that is protected by various security measures. For example, the secure enclave 338 may be hardware secured. In other embodiments, the secure enclave 338 may include one or more firewalls, encryption mechanisms, and/or other security-based protocols. Authentication credentials of a user may be required prior to providing the user access to data stored within the secure enclave 338.

The cache storage unit 340 may facilitate short-term deployment, storage, access, analysis, and/or utilization of data. In some embodiments, the cache storage unit 340 may serve as a short-term storage location for data so that the data stored in the cache storage unit 340 may be accessed quickly. In some embodiments, the cache storage unit 340 may include RAM and/or other storage media types that enable quick recall of stored data. The cache storage unit 340 may included a partitioned portion of storage media included in the memory unit 304.

The I/O unit 306 may include hardware and/or software elements for enabling the computing environment 300 to receive, transmit, and/or present information. For example, elements of the I/O unit 306 may be used to capture data associated with railroad tracks, display images of railroad tracks, receive user input from a user via a user device, present information to a user, and/or the like. In this manner, the I/O unit 306 may enable the computing environment 300 to interface with a railroad track and/or a human user. As described herein, the I/O unit 306 may include subunits such as an I/O device 342, an I/O calibration unit 344, and/or a driver 346.

The I/O device 342 may facilitate the receipt, transmission, processing, presentation, display, input, and/or output of information as a result of executed processes described herein. In some embodiments, the I/O device 342 may include a plurality of I/O devices. For example, the I/O device 342 may include a variety of elements that enable capturing of data associated with railroad tracks such as a sensor, a laser, a light, a camera, a receiver, and/or the like. The I/O device 342 may also include hardware for interfacing with a user, such as a keyboard, a touchscreen, a button, a sensor, a biometric scanner, a laser, a microphone, a camera, and/or another element for receiving and/or collecting input from a user. Additionally and/or alternatively, the I/O device 342 may include a display, a screen, a sensor, a vibration mechanism, a light emitting diode (LED), a speaker, a radio frequency identification (RFID) scanner, and/or another element for presenting and/or otherwise outputting data to a user. In some embodiments, the I/O device 342 may communicate with one or more elements of the processing unit 302 and/or the memory unit 304 to execute operations described herein.

The I/O calibration unit 344 may facilitate the calibration of the I/O device 342. For example, the I/O calibration unit 344 may detect and/or determine one or more settings of the I/O device 342, and then adjust and/or modify settings so that the I/O device 342 may operate more efficiently.

In some embodiments, the I/O calibration unit 344 may utilize a driver 346 (or multiple drivers) to calibrate the I/O device 342. For example, a driver 346 may be installed on a computer that enables a laser of the sending unit of the laser cart to define a working area along the railroad tracks in a particular manner. The driver 346 may also set a height of the sending unit on the laser car and/or a height of the receiver of the road rail stoneblower 100. In some embodiments, the I/O device 342 may be calibrated by the I/O calibration unit 344 by based on information included in the driver 346.

The communication unit 308 may facilitate establishment, maintenance, monitoring, and/or termination of communications (e.g., a communication connection) between computing devices and/or elements of the road rail stoneblower 100 described herein. The communication unit 308 may further enable communication between various elements (e.g., units and/or subunits) of the computing environment 300. In some embodiments, the communication unit 308 may include a network protocol unit 348, an API gateway 350, an encryption engine 352, and/or a communication device 354. The communication unit 308 may include hardware and/or software elements.

The network protocol unit 348 may facilitate establishment, maintenance, and/or termination of a communication connection between computing environment 300 and another computing environment (e.g., the first server 202 and the second server 204 of FIG. 11) by way of a network. For example, the network protocol unit 348 may detect and/or define a communication protocol required by a particular network and/or network type. Communication protocols utilized by the network protocol unit 348 may include Wi-Fi protocols, Li-Fi protocols, cellular data network protocols, Bluetooth® protocols, WiMAX protocols, Ethernet protocols, powerline communication (PLC) protocols, and/or the like. In some embodiments, facilitation of communication between the computing environment 300 and any other device, as well as any element internal to the computing environment 300, may include transforming and/or translating data from being compatible with a first communication protocol to being compatible with a second communication protocol. In some embodiments, the network protocol unit 348 may determine and/or monitor an amount of data traffic to consequently determine which particular network protocol is to be used for establishing a communication connection, transmitting data, and/or performing other operations described herein.

The API gateway 350 may facilitate the enablement of other devices and/or computing environments to access the API unit 330 of the memory unit 304 of the computing environment 300. For example, a user device may access the API unit 330 via the API gateway 350. In some embodiments, the API gateway 350 may be required to validate user credentials associated with a user of a user device prior to providing access to the API unit 330 to the user. The API gateway 350 may include instructions for enabling the computing environment 300 to communicate and share information with another device.

The encryption engine 352 may facilitate translation, encryption, encoding, decryption, and/or decoding of information received, transmitted, and/or stored by the computing environment 300. Using the encryption engine, each transmission of data may be encrypted, encoded, and/or translated for security reasons, and any received data may be encrypted, encoded, and/or translated prior to its processing and/or storage. In some embodiments, the encryption engine 352 may generate an encryption key, an encoding key, a translation key, and/or the like, which may be transmitted along with any data content.

The communication device 354 may include a variety of hardware and/or software specifically purposed to enable communication between the computing environment 300 and another device, as well as communication between elements of the computing environment 300. In some embodiments, the communication device 354 may include one or more radio transceivers, chips, analog front end (AFE) units, antennas, processing units, memory, other logic, and/or other components to implement communication protocols (wired or wireless) and related functionality for facilitating communication between the computing environment 300 and any other device. Additionally and/or alternatively, the communication device 354 may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

While various implementations in accordance with the disclosed principles have been described above, it should be understood that they have been presented by way of example only, and are not limiting. For example, in some embodiments, the system described herein may be used as a post measurement system, such as for confirming whether design criteria has been met. Thus, the breadth and scope of the implementations should not be limited by any of the above-described exemplary implementations, but should be defined only in accordance with the claims and their equivalents issuing from this disclosure. Furthermore, the above advantages and features are provided in described implementations, but shall not limit the application of such issued claims to processes and structures accomplishing any or all of the above advantages.

Various terms used herein have special meanings within the present technical field. Whether a particular term should be construed as such a "term of art," depends on the context in which that term is used. "Connected to," "in communication with," "communicably linked to," "in communicable range of" or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings herein are provided for consistency with the suggestions under 37 C.F.R. 1.77 or otherwise to provide organizational cues. These headings shall not limit or characterize the implementations set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any implementations in this disclosure. Neither is the "Summary" to be considered as a characterization of the implementations set forth in issued claims. Furthermore, any reference in this disclosure to "implementation" in the singular should not be used to argue that there is only a single point of novelty in this disclosure. Multiple implementations may be set forth according to the limitations of the multiple claims issuing from this disclosure, and such claims accordingly define the implementations, and their equivalents, that are protected thereby. In all instances, the scope of such claims shall be considered on their own merits in light of this disclosure, but should not be constrained by the headings herein.

Lastly, although similar reference numbers may be used to refer to similar elements for convenience, it can be appreciated that each of the various example implementations may be considered distinct variations.

What is claimed is:

1. A road rail stoneblower vehicle comprising:
   a hi-rail chassis comprising:
      a first set of wheels configured to engage a road surface; and
      a second set of wheels configured to engage surfaces of substantially parallel rails of a railroad track;
   a plurality of workheads coupled to the hi-rail chassis, each workhead being capable of dispensing ballast stones into a bed of ballast stones underlying the railroad track so as to adjust the height of the rails; and
   a leveling system detachedly coupled to the hi-rail chassis, the leveling system configured to transmit a detectable signal that defines a reference plane with which the rails are to be aligned.

2. The road rail stoneblower vehicle of claim 1, further comprising receivers disposed on the hi-rail chassis, the receivers being configured to detect the signal transmitted from the leveling system.

3. The road rail stoneblower vehicle of claim 1, wherein the leveling system is configured to be deployed on a bridge or overpass in defining the reference plane.

4. The road rail stoneblower vehicle of claim 1, wherein the workheads comprise one or more nozzles, the nozzles being configured to dispense the ballast stones into the bed of ballast.

5. The road rail stoneblower vehicle of claim 4, wherein the nozzles are in communication with a ballast supply.

6. The road rail stoneblower vehicle of claim 1, wherein the leveling system is a laser cart.

7. The road rail stoneblower vehicle of claim 1, wherein the leveling system is a projector system.

8. A method for dispensing ballast underneath a railroad track, comprising:
   deploying a road rail stoneblower vehicle on the railroad track, the road rail stoneblower vehicle having a leveling system detachedly coupled thereto;
   detaching the leveling system from the road rail stoneblower vehicle and deploying the leveling system to a first location along the railroad track;
   using the leveling system to define a reference frame with which the rails are to be aligned;
   measuring the height of the railroad track at a second location, spaced from the first location;
   calculating an amount of ballast to be dispensed underneath the railroad track at the second location based on a comparison of the height of the railroad track at the second location and the reference frame.

9. The method of claim 8, wherein the road rail stoneblower vehicle includes at least one receiver disposed thereon, and wherein measuring the height of the railroad track at the second location comprises receiving a signal from the leveling system at the receiver.

10. The method of claim 8, further comprising, after measuring the height of the railroad track at the second location, measuring the height of the railroad track at additional locations spaced from the first and second locations.

11. The method of claim 10, wherein the road rail stoneblower vehicle moves away from the first location during measurement of the height of the railroad at the second location, and thereafter at the additional locations.

12. The method of claim 11, wherein the road rail stoneblower vehicle includes a jack, further comprising using the jack to adjust the height of the rail at one or more of the additional locations and the second location.

13. The method of claim 12, wherein the height of the rail is adjusted at the second location based on the comparison of the height of the railroad track at the second location and the reference frame.

14. The method of claim 12, wherein the road rail stoneblower vehicle moves toward the first location during adjustment of the height of the rail at the one or more of the additional locations and the second location.

15. The method of claim 14, further using the road rail stoneblower vehicle to dispense ballast at one or more of the second location and additional locations.

16. The method of claim 15, wherein the road rail stoneblower vehicle moves away from the first location during dispensing of ballast at one or more of the second location and additional locations.

17. The method of claim 10, further comprising calculating an amount of ballast to be dispensed underneath the railroad track at the additional locations based on a comparison of the height of the railroad track at the additional locations and the reference frame.

* * * * *